United States Patent
Bultje

(10) Patent No.: US 9,781,447 B1
(45) Date of Patent: Oct. 3, 2017

(54) CORRELATION BASED INTER-PLANE PREDICTION ENCODING AND DECODING

(75) Inventor: Ronald Sebastiaan Bultje, San Jose, CA (US)

(73) Assignee: GOOGLE INC., Mountain View, CA (US)

( * ) Notice: Subject to any disclaimer, the term of this patent is extended or adjusted under 35 U.S.C. 154(b) by 873 days.

(21) Appl. No.: 13/529,345

(22) Filed: Jun. 21, 2012

(51) Int. Cl.
*H04N 7/32* (2006.01)
*H04N 11/02* (2006.01)
*H04N 19/593* (2014.01)
*H04N 19/186* (2014.01)
*H04N 19/176* (2014.01)
*H04N 19/119* (2014.01)

(52) U.S. Cl.
CPC ......... *H04N 19/593* (2014.11); *H04N 19/186* (2014.11); *H04N 19/119* (2014.11); *H04N 19/176* (2014.11)

(58) Field of Classification Search
CPC .. H04N 19/593; H04N 19/186; H04N 19/119; H04N 19/176
USPC ............... 375/240.02, 240.12, 240.16, 375/240.24–240.26
See application file for complete search history.

(56) References Cited

U.S. PATENT DOCUMENTS

| | | |
|---|---|---|
| 5,150,209 A | 9/1992 | Baker et al. |
| 5,708,473 A | 1/1998 | Mead |
| 5,767,987 A | 6/1998 | Wolff et al. |
| 5,787,192 A * | 7/1998 | Takaichi .................. H04N 1/64 358/539 |
| 5,916,449 A | 6/1999 | Ellwart et al. |
| 5,930,387 A | 7/1999 | Chan et al. |
| 5,956,467 A | 9/1999 | Rabbani et al. |
| 6,005,625 A | 12/1999 | Yokoyama |
| 6,044,166 A | 3/2000 | Bassman et al. |
| 6,058,211 A | 5/2000 | Bormans et al. |
| 6,208,765 B1 | 3/2001 | Bergen |
| 6,285,804 B1 | 9/2001 | Crinon et al. |
| 6,292,837 B1 | 9/2001 | Miller et al. |

(Continued)

FOREIGN PATENT DOCUMENTS

| | | |
|---|---|---|
| EP | 1903698 | 3/2008 |
| JP | 2007267414 | 10/2007 |

OTHER PUBLICATIONS

Bankoski et al. "Technical Overview of VP8, an Open Source Video Codec for the Web". Dated Jul. 11, 2011.

(Continued)

*Primary Examiner* — Gims Philippe
*Assistant Examiner* — On S Mung
(74) *Attorney, Agent, or Firm* — Young Basile Hanlon & MacFarlane, P.C.

(57) ABSTRACT

A system, apparatus, and method for encoding and decoding a video stream having a plurality of frames are disclosed. Disclosed implementations encode frames having a plurality of planes that include representations of color video data, for example YUV, relying on correlation between planes to form prediction blocks to predict blocks of another plane. Disclosed implementations use lookup tables formed from pixels peripheral to the blocks to transform blocks into prediction blocks. For example, blocks from the Y plane can be used to predict blocks from the U or V planes, or blocks from U or V planes can be used to predict blocks from the Y plane.

19 Claims, 9 Drawing Sheets

(56) References Cited

U.S. PATENT DOCUMENTS

| | | |
|---|---|---|
| 6,314,208 B1 | 11/2001 | Konstantinides et al. |
| 6,349,154 B1 | 2/2002 | Kleihorst |
| 6,473,460 B1 | 10/2002 | Topper |
| 6,611,620 B1 | 8/2003 | Kobayashi et al. |
| 6,628,845 B1 | 9/2003 | Stone et al. |
| 6,650,704 B1 | 11/2003 | Carlson et al. |
| 6,654,419 B1 | 11/2003 | Sriram et al. |
| 6,785,425 B1 | 8/2004 | Feder et al. |
| 6,798,901 B1 | 9/2004 | Acharya et al. |
| 6,907,079 B2 | 6/2005 | Gomila et al. |
| 7,106,910 B2 | 9/2006 | Acharya et al. |
| 7,116,830 B2 | 10/2006 | Srinivasan |
| 7,158,681 B2 | 1/2007 | Persiantsev |
| 7,197,070 B1 | 3/2007 | Zhang et al. |
| 7,218,674 B2 | 5/2007 | Kuo |
| 7,263,125 B2 | 8/2007 | Lainema |
| 7,333,544 B2 | 2/2008 | Kim et al. |
| 7,466,774 B2 | 12/2008 | Boyce |
| 7,602,851 B2 | 10/2009 | Lee et al. |
| 7,602,997 B2 | 10/2009 | Young |
| 7,689,051 B2 | 3/2010 | Mukerjee |
| 7,924,918 B2 | 4/2011 | Lelescu et al. |
| 8,094,722 B2 | 1/2012 | Wang |
| 8,111,914 B2 | 2/2012 | Lee et al. |
| 8,135,064 B2 | 3/2012 | Tasaka et al. |
| 8,320,470 B2 | 11/2012 | Huang et al. |
| 8,369,402 B2 | 2/2013 | Kobayashi et al. |
| 8,559,512 B2 | 10/2013 | Paz |
| 8,885,956 B2 | 11/2014 | Sato |
| 9,167,268 B1 | 10/2015 | Gu et al. |
| 9,247,251 B1 | 1/2016 | Bultje |
| 2002/0017565 A1 | 2/2002 | Ju et al. |
| 2002/0026639 A1 | 2/2002 | Haneda |
| 2002/0071485 A1 | 6/2002 | Caglar et al. |
| 2003/0202705 A1 | 10/2003 | Sun |
| 2003/0215018 A1 | 11/2003 | MacInnis et al. |
| 2003/0215135 A1 | 11/2003 | Caron et al. |
| 2003/0234795 A1* | 12/2003 | Lee ............... H04N 9/67 345/601 |
| 2004/0001634 A1 | 1/2004 | Mehrotra |
| 2004/0101045 A1* | 5/2004 | Yu et al. ............... 375/240.02 |
| 2004/0252886 A1 | 12/2004 | Pan et al. |
| 2005/0068208 A1 | 3/2005 | Liang et al. |
| 2005/0078754 A1 | 4/2005 | Liang et al. |
| 2005/0123207 A1 | 6/2005 | Marpe et al. |
| 2005/0180500 A1 | 8/2005 | Chiang et al. |
| 2006/0056689 A1 | 3/2006 | Wittebrood et al. |
| 2006/0078754 A1 | 4/2006 | Murakami et al. |
| 2006/0164543 A1 | 7/2006 | Richardson et al. |
| 2006/0203916 A1 | 9/2006 | Chandramouly et al. |
| 2006/0215751 A1 | 9/2006 | Reichel et al. |
| 2007/0025441 A1 | 2/2007 | Ugur et al. |
| 2007/0036354 A1 | 2/2007 | Wee et al. |
| 2007/0076964 A1 | 4/2007 | Song |
| 2007/0080971 A1 | 4/2007 | Sung |
| 2007/0121100 A1 | 5/2007 | Divo |
| 2007/0177673 A1 | 8/2007 | Yang |
| 2007/0216777 A1 | 9/2007 | Quan et al. |
| 2007/0217701 A1 | 9/2007 | Liu et al. |
| 2008/0069440 A1 | 3/2008 | Forutanpour |
| 2008/0123750 A1 | 5/2008 | Bronstein et al. |
| 2008/0170615 A1 | 7/2008 | Sekiguchi et al. |
| 2008/0212678 A1 | 9/2008 | Booth et al. |
| 2008/0239354 A1 | 10/2008 | Usui |
| 2008/0260042 A1 | 10/2008 | Shah et al. |
| 2008/0294962 A1 | 11/2008 | Goel |
| 2008/0310745 A1 | 12/2008 | Ye et al. |
| 2009/0041119 A1 | 2/2009 | Thoreau et al. |
| 2009/0161763 A1 | 6/2009 | Rossignol et al. |
| 2009/0190659 A1 | 7/2009 | Lee et al. |
| 2009/0232401 A1 | 9/2009 | Yamashita et al. |
| 2009/0257492 A1 | 10/2009 | Andersson et al. |
| 2010/0021009 A1 | 1/2010 | Yao |
| 2010/0023979 A1 | 1/2010 | Patel et al. |
| 2010/0034265 A1 | 2/2010 | Kim et al. |
| 2010/0034268 A1 | 2/2010 | Kusakabe et al. |
| 2010/0086028 A1 | 4/2010 | Tanizawa et al. |
| 2010/0104021 A1 | 4/2010 | Schmit |
| 2010/0111182 A1 | 5/2010 | Karczewicz et al. |
| 2010/0118943 A1 | 5/2010 | Shiodera et al. |
| 2010/0118945 A1 | 5/2010 | Wada et al. |
| 2010/0195715 A1 | 8/2010 | Liu et al. |
| 2010/0266008 A1 | 10/2010 | Reznik |
| 2010/0312811 A1 | 12/2010 | Reznik |
| 2010/0329341 A1 | 12/2010 | Kam et al. |
| 2011/0002541 A1 | 1/2011 | Varekamp |
| 2011/0026591 A1 | 2/2011 | Bauza et al. |
| 2011/0033125 A1 | 2/2011 | Shiraishi |
| 2011/0069890 A1 | 3/2011 | Besley |
| 2011/0158529 A1 | 6/2011 | Malik |
| 2011/0170595 A1 | 7/2011 | Shi et al. |
| 2011/0170596 A1 | 7/2011 | Shi et al. |
| 2011/0170597 A1 | 7/2011 | Shi et al. |
| 2011/0170608 A1 | 7/2011 | Shi et al. |
| 2011/0206135 A1 | 8/2011 | Drugeon et al. |
| 2011/0206289 A1 | 8/2011 | Dikbas et al. |
| 2011/0211757 A1 | 9/2011 | Kim et al. |
| 2011/0216834 A1 | 9/2011 | Zhou |
| 2011/0235706 A1 | 9/2011 | Demircin et al. |
| 2011/0243225 A1 | 10/2011 | Min et al. |
| 2011/0243229 A1 | 10/2011 | Kim et al. |
| 2011/0243230 A1 | 10/2011 | Liu |
| 2011/0249741 A1 | 10/2011 | Zhao et al. |
| 2011/0255592 A1 | 10/2011 | Sung et al. |
| 2011/0268359 A1 | 11/2011 | Steinberg et al. |
| 2011/0293001 A1 | 12/2011 | Lim et al. |
| 2012/0014439 A1 | 1/2012 | Segall et al. |
| 2012/0014444 A1 | 1/2012 | Min et al. |
| 2012/0020408 A1 | 1/2012 | Chen et al. |
| 2012/0039384 A1 | 2/2012 | Reznik |
| 2012/0039388 A1 | 2/2012 | Kim et al. |
| 2012/0063691 A1 | 3/2012 | Yu et al. |
| 2012/0082220 A1 | 4/2012 | Mazurenko et al. |
| 2012/0177108 A1 | 7/2012 | Joshi et al. |
| 2012/0278433 A1 | 11/2012 | Liu et al. |
| 2012/0287986 A1 | 11/2012 | Paniconi et al. |
| 2012/0287998 A1 | 11/2012 | Sato |
| 2012/0300837 A1 | 11/2012 | Wilkins et al. |
| 2012/0307884 A1 | 12/2012 | MacInnis |
| 2012/0314942 A1 | 12/2012 | Williams et al. |
| 2012/0320975 A1 | 12/2012 | Kim et al. |
| 2013/0027230 A1 | 1/2013 | Marpe et al. |
| 2013/0121415 A1* | 5/2013 | Wahadaniah et al. ... 375/240.12 |
| 2014/0044166 A1 | 2/2014 | Xu et al. |
| 2016/0037174 A1 | 2/2016 | Gu et al. |

OTHER PUBLICATIONS

Bankoski et al. "VP8 Data Format and Decoding Guide" Independent Submission. RFC 6389, Dated Nov. 2011.

Bankoski et al. "VP8 Data Format and Decoding Guide; draft-bankoski-vp8-bitstream-02" Network Working Group. Internet-Draft, May 18, 2011, 288 pp.

Implementors' Guide; Series H: Audiovisual and Multimedia Systems; Coding of moving video: Implementors Guide for H.264: Advanced video coding for generic audiovisual services. H.264. International Union. Version 12. Dated Jul. 30, 2010.

Mozilla, "Introduction to Video Coding Part 1: Transform Coding", Video Compression Overview, Mar. 2012, 171 pp.

Overview; VP7 Data Format and Decoder. Version 1.5. On2 Technologies, Inc. Dated Mar. 28, 2005.

Park, Jun Sung, et al., "Selective Intra Prediction Mode Decision for H.264/AVC Encoders", World Academy of Science, Engineering and Technology 13, (2006).

Series H: Audiovisual and Multimedia Systems; Infrastructure of audiovisual services—Coding of moving video. H.264. Advanced video coding for generic audiovisual services. International Telecommunication Union. Verion 11. Dated Mar. 2009.

Series H: Audiovisual and Multimedia Systems; Infrastructure of audiovisual services—Coding of moving video. H.264. Advanced video coding for generic audiovisual services. International Telecommunication Union. Version 12. Dated Mar. 2010.

(56) References Cited

OTHER PUBLICATIONS

Series H: Audiovisual and Multimedia Systems; Infrastructure of audiovisual services—Coding of moving video. H.264. Amendment 2: New profiles for professional applications. International Telecommunication Union. Dated Apr. 2007.

Series H: Audiovisual and Multimedia Systems; Infrastructure of audiovisual services—Coding of moving video. H.264. Advanced video coding for generic audiovisual services. Version 8. International Telecommunication Union. Dated Nov. 1, 2007.

Series H: Audiovisual and Multimedia Systems; Infrastructure of audiovisual services—Coding of moving video; Advanced video coding for generic audiovisual services. H.264. Amendment 1: Support of additional colour spaces and removal of the High 4:4:4 Profile. International Telecommunication Union. Dated Jun. 2006.

Series H: Audiovisual and Multimedia Systems; Infrastructure of audiovisual services—Coding of moving video; Advanced video coding for generic audiovisual services. H.264. Version 1. International Telecommunication Union. Dated May 2003.

Series H: Audiovisual and Multimedia Systems; Infrastructure of audiovisual services—Coding of moving video; Advanced video coding for generic audiovisual services. H.264. Version 3. International Telecommunication Union. Dated Mar. 2005.

VP6 Bitstream & Decoder Specification. Version 1.02. On2 Technologies, Inc. Dated Aug. 17, 2006.

VP6 Bitstream & Decoder Specification. Version 1.03. On2 Technologies, Inc. Dated Oct. 29, 2007.

VP8 Data Format and Decoding Guide. WebM Project. Google On2. Dated: Dec. 1, 2010.

Su M_T Sun University of Washington et al. "Encoder Optimization for H.264/AVC Fidelity Range Extensions" Jul. 12, 2005.

Pan et al., "Fast mode decision algorithms for inter/intra prediction in H.264 video coding." Advances in Multimedia Information Processing PCM 2007. Springer Berlin Heidelberg, 2007. pp. 158-167.

Kim et al., "Fast H.264 intra-prediction mode selection using joint spatial and transform domain features." Journal of Visual Communication and Image Representation 17.2, 2006, pp. 291-310.

\* cited by examiner

| n-s-1 | n-s | | | n-s+(i-1) |
|---|---|---|---|---|
| n-1 | n | n+1 | ... | n+(i-1) |
| n+s-1 | n+s | | | n+s+i |
| ... | ... | ... | ... | ... |
| n+s*(j-1) | n+s*(j-1) | | | n+s*(j-1)+(i-1) |

CORRELATION BASED INTER-PLANE PREDICTION ENCODING AND DECODING

TECHNICAL FIELD

The present invention relates in general to video encoding and decoding.

BACKGROUND

Digital video streams can represent video using a sequence of frames (i.e. still images) that are encoded using planes. An increasing number of applications today make use of digital video compression. Reducing the size of the bitstream reduces the bandwidth required to transmit or store a digital video stream prior to decoding.

SUMMARY

Disclosed herein are implementations of systems, methods, and apparatuses for decoding a video signal. One aspect of the disclosed implementations is a method for decoding a video stream having a plurality of frames that include a plurality of blocks. The method includes decoding a first block of the plurality of blocks, wherein the first block is indicative of data associated with a first plane of the video stream, and wherein the first block is at least partially spatially coextensive with a second block of the plurality of blocks that is indicative of data associated with a second plane of the video stream, determining, using a computing device, a first lookup table based on values of spatially coextensive pixels of the first and second planes that are peripheral to the first block and the second block, generating a predicted second block using the first block and the first lookup table, and decoding the second block using the predicted second block.

Another aspect of the disclosed implementations is a method for encoding a video stream having a plurality of frames that include a plurality of blocks. The method includes determining, using a computing device, a first lookup table based on values of spatially coextensive pixels of first and second planes of the video stream that are peripheral to a first block of the plurality of blocks and a second block of the plurality of blocks, wherein the first block is indicative of data associated with the first plane, the second block is indicative of data associated with the second plane and wherein the first block is at least partially spatially coextensive with the second block, generating a predicted second block using the first block and the first lookup table, and encoding the second block using the predicted second block Another aspect of the disclosed implementations is an apparatus for decoding a frame in a video stream having a plurality of frames that include a plurality of blocks. The apparatus includes a memory and a processor configured to execute instructions stored in the memory to decode a first block of the plurality of blocks, wherein the first block is indicative of data associated with a first plane of the video stream, and wherein the first block is at least partially spatially coextensive with a second block of the plurality of blocks that is indicative of data associated with a second plane of the video stream, determine a first lookup table based on values of spatially coextensive pixels that are peripheral to the first block and the second block, generate a predicted second block using the first block and the first lookup table, and decode the second block using the predicted second block.

These and other implementations will be described in additional detail hereafter.

BRIEF DESCRIPTION OF THE DRAWINGS

The description herein makes reference to the accompanying drawings wherein like reference numerals refer to like parts throughout the several views, and wherein:

FIG. 8 is a diagram of a portion of a plane showing a block and peripheral pixels used to form a lookup table in accordance with disclosed implementations.

DETAILED DESCRIPTION

Figure 1:
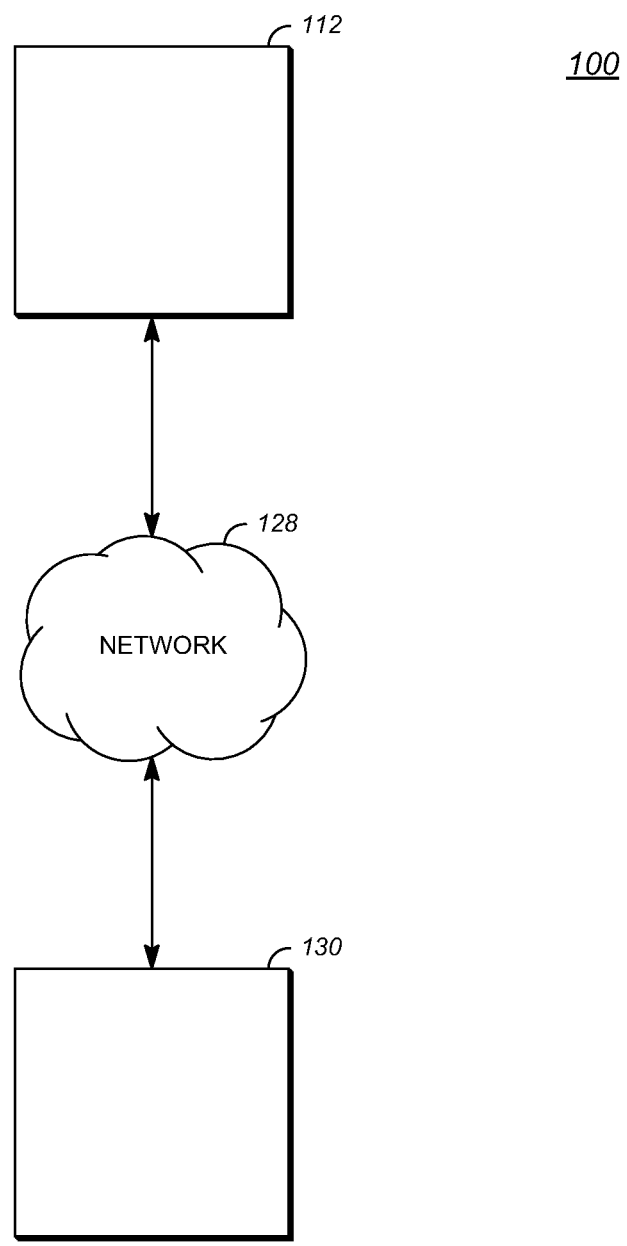
FIG. 1 is a schematic of a video encoding and decoding system.

Digital video is used for various purposes including, for example, remote business meetings via video conferencing, high definition video entertainment, video advertisements, and sharing of user-generated videos. As technology is evolving, users have higher expectations for video quality and expect high resolution video even when transmitted over communications channels having limited bandwidth.

Digital video streams can include formats such as VP8 and H.264, including present and future versions thereof. H.264 is also known as MPEG-4 Part 10 or MPEG-4 AVC (formally, ISO/IEC 14496-10).

A frame of a digital video stream can be represented using a plurality of planes, where each plane can represent a component of the frame's video data. Each plane can be comprised of blocks containing pixels arranged as rectangular arrays, for example blocks of 4×4, 8×8, 16×16, or 32×32 pixels. For example, a video stream can be represented by frames having three planes containing the red, blue and green (RGB) color components. Each plane contains blocks representing one of the three color components. Blocks that represent different components of the same spatial location in the frame are referred to as being "spatially coexistent." In another example, a color video stream can be represented by frames having three planes containing a luminance plane (Y), a first chrominance plane (U) and a second chrominance plane (V). Other color encodings can also be utilized. For example, some video encodings use an alpha or transparency plane along with color planes. In some examples, multi-plane color video representations can be created by transforming one representation into another. For example, an RGB frame can be transformed into a YUV frame by a linear transformation applied to the pixels of the planes.

One step in video encoding can include prediction. Prediction can include intra-plane prediction, where the contents of a second block of pixels from a second plane can be predicted using pixels peripheral to the second block and spatially coextensive pixels peripheral to a first block from a first plane. The peripheral pixels are used to form a lookup table that can be used to transform pixels from a first block from a first plane to form a predicted block to predict the pixel values of the second block. The predicted block can be subtracted from the contents of the second block to form a residual block. The residual block can then be transformed and further encoded to be included in an encoded video bitstream. Blocks to be used for prediction can be encoded and decoded by the encoder prior to being used for prediction in order to more closely match the pixel values to be used during the decoding process. A block encoded using prediction can be represented by fewer bits in the encoded video bitstream than one not encoded using prediction, and can thereby save transmission bandwidth and/or storage space while maintaining similar video quality.

Predicting a second block in a second plane using pixels from a spatially coextensive first block in a first plane of the same frame can be improved by using ways to transform the pixels of the first block into values that more closely approximate the pixels in the second block. Aspects of disclosed implementations can perform this transformation by constructing a lookup table using spatially coextensive pixels peripheral to the first and second blocks. Other ways to effect this transformation could include using linear regression, for example, to calculate a linear relationship between the pixels of the two planes and applying the linear relationship to the pixels of the first block to predict the pixels of the second block. Other ways to implement this transformation can include approximating the transform on a per-pixel basis based on minimizing the residual values following prediction, for example.

The decoding of an encoded video bitstream by a decoder can include inverse transforming a second block from a second plane to form a residual block. The second block can then be predicted using the residual values and a predicted block formed from a spatially coextensive first block from a first plane and a lookup table formed from pixels peripheral to the first and second blocks. The predicted block formed from the first block from the first plane is added to the residual block from the second plane to reconstruct the contents of the second block. Decoding the second block in this manner uses the same data used to predict the block during encoding. Blocks in video streams can be a 4×4 array of pixels, an 8×8 array of pixels, a 16×16 array of pixels, a 32×32 array of pixels, or any other grouping of pixels.

In a YUV representation, the three planes can be sampled at different sampling rates, wherein, for example, the U and/or V planes can contain less data than the Y plane. In an example of this type of representation, the U and V planes can each contain one quarter of the data in the Y plane (e.g., one quarter of the number of pixels).

The disclosed implementations can utilize blocks associated with one or more planes to predict a block associated with another plane. For example, the disclosed implementations can utilize blocks associated with Y to predict blocks associated with U and V, blocks associated with U to predict blocks associated with Y and V, blocks associated with U and V together to predict blocks associated with Y, or can predict blocks using other combinations of planes.

Aspects of disclosed implementations can perform prediction using data associated with a first block in a first plane to predict a second block in a second plane in the same frame along with a lookup table formed from spatially coextensive pixels from the first and second planes. A lookup table can be constructed using spatially coextensive pixels peripheral to the block to be predicted from a second plane and pixels peripheral to a corresponding block associated with a first plane of the frame. Spatially coextensive can refer to pixels having spatially corresponding locations in separate planes. The lookup table can be used to improve the prediction of a block by mapping pixel values from the predicting plane to the plane to be predicted. Pixels from a block associated with a first plane at the location corresponding to the block to be predicted in the second plane can be transformed using the lookup table to form a prediction block. The prediction block formed from the block in the first plane can be subtracted from the block in the second plane to form a residual block. The residual block can be further encoded to be included in the encoded video bitstream. The predicted encoded residual block can result in fewer bits to be included in the encoded video bitstream than a block encoded without using prediction.

The data used to form lookup tables and prediction blocks can be encoded and decoded by the encoder prior to being used in order to more closely match the data to be used by the decoder to perform prediction and thereby improve the accuracy of the result. Aspects of disclosed implementations can compensate for differences in sampling rate between planes by replicating or averaging pixels to up- or down-sample data to match sampling rates. A filter can be applied to up-sampled pixels to improve results.

Aspects of the disclosed implementations include decoding blocks using planes in a similar fashion to the encoding implementations described above. Decoded pixels are used to form a lookup table which uses a decoded block from one or more planes to form a prediction block for another plane. A block is partially decoded to form a residual block which is added to the prediction block to form a decoded block.

FIG. 1 is a schematic of a video encoding and decoding system 100. An exemplary transmitting station 112 can be, for example, a computer having an internal configuration of hardware such as that described in FIG. 2. However, other suitable implementations of the transmitting station 112 are possible. For example, the processing of the transmitting station 112 can be distributed among multiple devices.

A network 128 can connect the transmitting station 112 and a receiving station 130 for encoding and decoding of the video stream. Specifically, the video stream can be encoded in the transmitting station 112 and the encoded video stream can be decoded in the receiving station 130. The network 128 can, for example, be the Internet. The network 128 can also be a local area network (LAN), wide area network (WAN), virtual private network (VPN), or any other means of transferring the video stream from the transmitting station 112.

Figure 2:
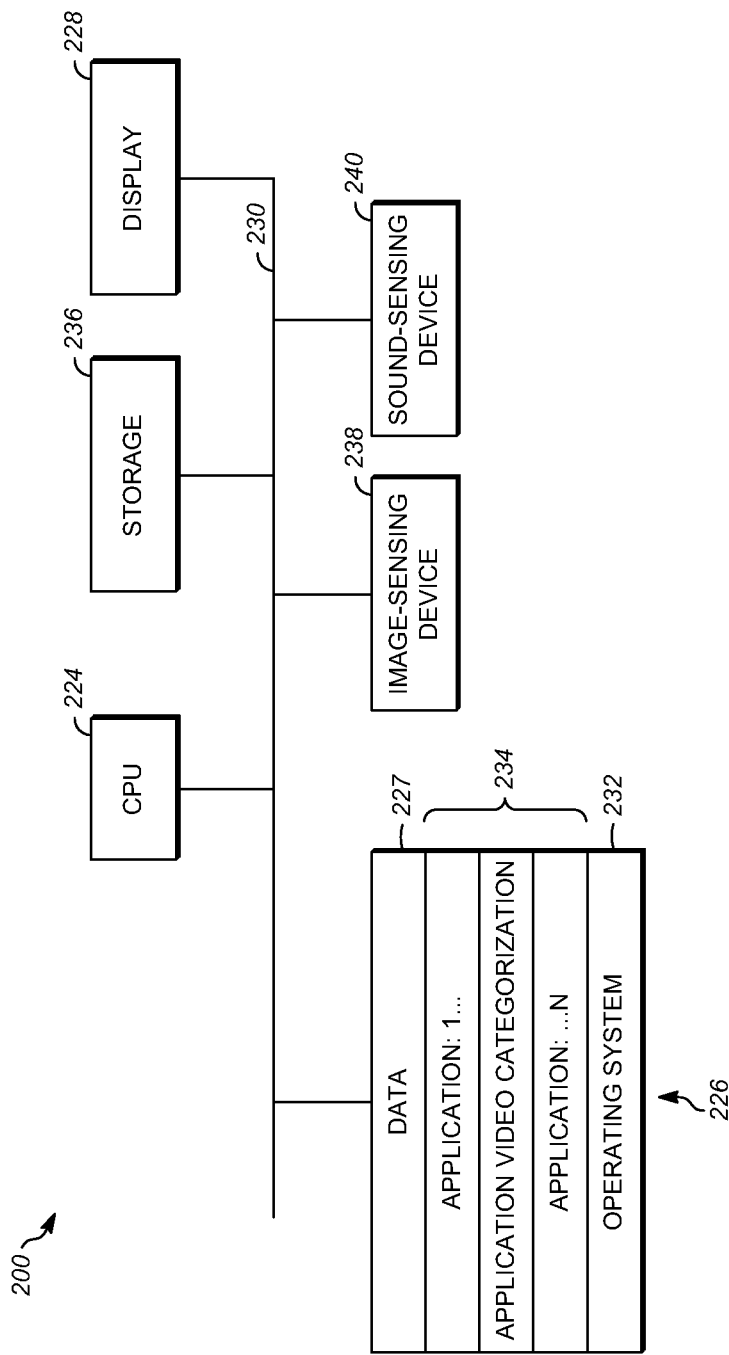
FIG. 2 is a block diagram of an exemplary computing device implementing the stations of FIG. 1.

The receiving station 130, in one example, can be a computer having an internal configuration of hardware such as that described in FIG. 2. However, other suitable implementations of the receiving station 130 are possible. For example, the processing of the receiving station 130 can be distributed among multiple devices.

Other implementations of the encoding and decoding system 100 are possible. For example, an implementation can omit the network 128. In another implementation, a video stream can be encoded and then stored for transmission at a later time to the receiving station 130 or any other device having memory. In one implementation, the receiving station 130 receives (e.g., via network 128, a computer bus, and/or some communication pathway) the encoded video stream and stores the video stream for later decoding.

FIG. 2 is a block diagram of an exemplary computing device implementing the stations 112 and 130 of FIG. 1. The computing device 200 can be in the form of a computing system including multiple computing devices, or in the form of a single computing device, for example, a mobile phone, a tablet computer, a laptop computer, a notebook computer, a desktop computer, and the like.

The CPU 224 in the computing device 200 can be a conventional central processing unit. Alternatively, the CPU 224 can be any other type of device, or multiple devices, capable of manipulating or processing information now-existing or hereafter developed. Although the disclosed implementations can be practiced with a single processor as shown, e.g. CPU 224, advantages in speed and efficiency can be achieved using more than one processor.

The memory 226 in the computing device 200 can be a random access memory device (RAM). Any other suitable type of storage device can be used as the memory 226. The memory 226 can include code and data 227 that is accessed by the CPU 224 using a bus 230. The memory 226 can further include an operating system 232 and application programs 234, the application programs 234 including programs that permit the CPU 224 to perform the methods described here. For example, the application programs 234 can include applications 1 through N which further include a video communication application that performs the methods described here. The computing device 200 can also include a secondary storage 236, which can, for example, be a memory card used with a mobile computing device 200. Because the video communication sessions may contain a significant amount of information, they can be stored in whole or in part in the secondary storage 236 and loaded into the memory 226 as needed for processing.

The computing device 200 can also include one or more output devices, such as the display 228, which can be a touch sensitive display that combines a display with a touch sensitive element that is operable to sense touch inputs. The display 228 can be coupled to the CPU 224 via the bus 230. Other output devices that permit a user to program or otherwise use the computing device 200 can be provided in addition to or as an alternative to the display 228. When the output device is or includes a display, the display can be implemented in various ways, including by a liquid crystal display (LCD) or a cathode-ray tube (CRT) or light emitting diode (LED) display, such as an OLED display.

The computing device 200 can also include or be in communication with an image-sensing device 238, for example a camera, or any other image-sensing device 238 now existing or hereafter developed that can sense the image of a device user operating the computing device 200. The image-sensing device 238 can be positioned such that it is directed toward a device user that is operating the computing device 200. For example, the position and optical axis of the image-sensing device 238 can be configured such that the field of vision includes an area that is directly adjacent to the display 228, from which the display 228 is visible. The image-sensing device 238 can be configured to receive images, for example, of the face of a device user while the device user is operating the computing device 200.

The computing device 200 can also include or be in communication with a sound-sensing device 240, for example a microphone, or any other sound-sensing device now existing or hereafter developed that can sense the sounds made by the device user operating the computing device 200. The sound-sensing device 240 can be positioned such that it is directed toward the device user operating the computing device 200. The sound-sensing device 240 can be configured to receive sounds, for example, speech or other utterances made by the device user while the device user operates the computing device 200.

Although FIG. 2 depicts the CPU 224 and the memory 226 of the computing device 200 as being integrated into a single unit, other configurations can be utilized. The operations of the CPU 224 can be distributed across multiple machines (each machine having one or more of processors) which can be coupled directly or across a local area or other network. The memory 226 can be distributed across multiple machines such as network-based memory or memory in multiple machines performing the operations of the computing device 200. Although depicted here as a single bus, the bus 230 of the computing device 200 can be composed of multiple buses. Further, the secondary storage 236 can be directly coupled to the other components of the computing device 200 or can be accessed via a network and can comprise a single integrated unit such as a memory card or multiple units such as multiple memory cards. The computing device 200 can thus be implemented in a wide variety of configurations.

Figure 3:
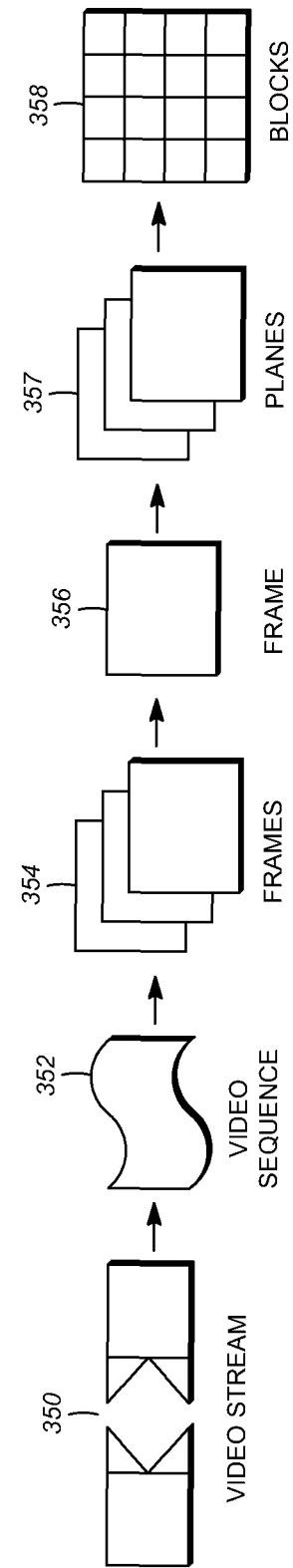
FIG. 3 is a diagram of a typical video stream to be encoded and decoded.

FIG. 3 is a diagram of an example of a video stream 350 to be encoded and decoded. Video coding formats, such as VP8 or H.264, can provide a defined hierarchy of layers for a video stream. The video stream 350 includes a video sequence 352. At the next level, the video sequence 352 includes a number of adjacent frames 354. While three frames are depicted in adjacent frames 354, the video sequence 352 can include any number of adjacent frames. The adjacent frames 354 can then be further subdivided into a single frame 356. A single frame 356 can include multiple planes 357. In an example of a disclosed implementation, three planes representing YUV data can be included in a single frame. At the next level, each plane 357 can be divided into a series of blocks 358, which can contain data corresponding to, for example, a block of displayed pixels associated with a plane. The blocks 358 can also be of any suitable size such as 8×8 pixel groups or 16×16 pixel groups.

Figure 4:
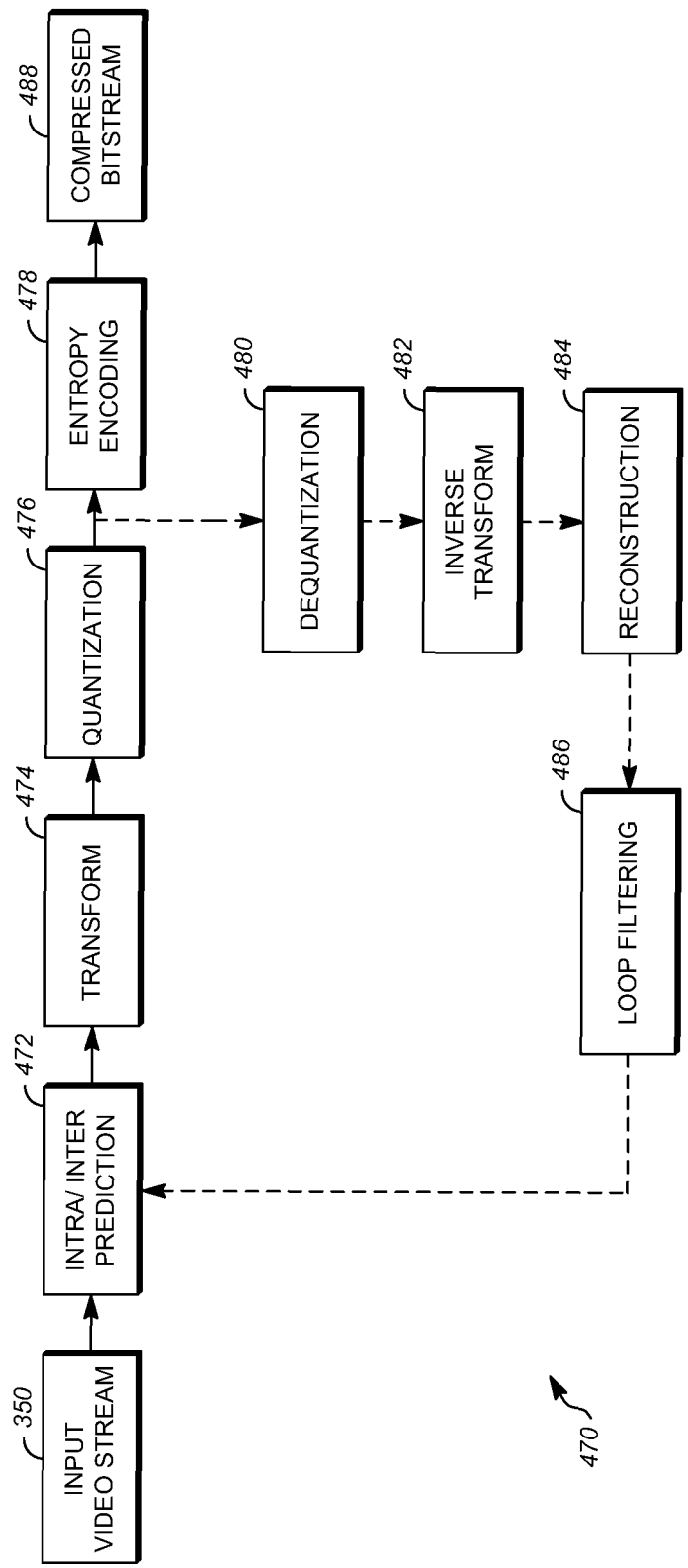
FIG. 4 is a block diagram of a video compression system in accordance with an implementation.

FIG. 4 is a block diagram of an encoder 470 in accordance with an implementation. The encoder 470 can be implemented, as described above, in the transmitting station 112 such as by providing a computer software program stored in memory such as memory 226, for example. The computer software program can include machine instructions that, when executed by a processor such as CPU 224, cause transmitting station 112 to encode video data in the manner described in FIG. 4. Encoder 470 can also be implemented as specialized hardware included, for example, in transmitting station 112. The encoder 470 encodes an input video stream 350. The encoder 470 has the following stages to perform the various functions in a forward path (shown by the solid connection lines) to produce an encoded or a compressed bitstream 488: an intra/inter prediction stage 472, a transform stage 474, a quantization stage 476, and an entropy encoding stage 478. The encoder 470 also includes a reconstruction path (shown by the dotted connection lines) to reconstruct a frame for encoding of further blocks. The encoder 470 can have the following stages to perform the various functions in the reconstruction path: a dequantization stage 480, an inverse transform stage 482, a reconstruction stage 484, and a loop filtering stage 486. Other structural variations of the encoder 470 can be used to encode the video stream 350.

When the video stream 350 is presented for encoding, each frame 356 including planes 357 within the video stream 350 can be processed in units of blocks. At the intra/inter prediction stage 472, each block can be encoded using either intra-frame prediction (within a single frame), inter-frame prediction (from frame to frame) or inter-plane prediction (from plane to plane within a single frame). In either case, a prediction block can be formed. In the case of intra-prediction, a prediction block can be formed from samples in the current frame that have been previously encoded and reconstructed. In the case of inter-prediction, a prediction block can be formed from samples in one or more previously constructed reference frames. In the case of correlation-based inter-plane prediction, a prediction block can be formed from samples from a plane or planes other than the plane including the block to be predicted.

Next, still referring to FIG. 4, the prediction block can be subtracted from the current block at the intra/inter prediction stage 472 to produce a residual block (residual). The transform stage 474 transforms the residual into transform coefficients in, for example, the frequency domain. Examples of block-based transforms include the Karhunen-Loève Transform (KLT), the Discrete Cosine Transform ("DCT"), and the Singular Value Decomposition Transform ("SVD"). In one example, the DCT transforms the block into the frequency domain. In the case of DCT, the transform coefficient values are based on spatial frequency, with the lowest frequency (DC) coefficient at the top-left of the matrix and the highest frequency coefficient at the bottom-right of the matrix.

The quantization stage 476 converts the transform coefficients into discrete quantum values, which are referred to as quantized transform coefficients or quantization levels. The quantized transform coefficients are then entropy encoded by the entropy encoding stage 478. The entropy-encoded coefficients, together with the information used to decode the block, such as the type of prediction used, motion vectors and quantizer value, are then output to the compressed bitstream 488. The compressed bitstream 488 can be formatted using various techniques, such as variable length coding (VLC) or entropy coding.

The reconstruction path in FIG. 4 (shown by the dotted connection lines) can be used to help ensure that both the encoder 470 and a decoder 500 (described below) use the same reference frames to decode the compressed bitstream 488. The reconstruction path performs functions that are similar to functions that take place during the decoding process that are discussed in more detail below, including dequantizing the quantized transform coefficients at the dequantization stage 480 and inverse transforming the dequantized transform coefficients at the inverse transform stage 482 to produce a derivative residual block (derivative residual). At the reconstruction stage 484, the prediction block that was predicted at the intra/inter prediction stage 472 can be added to the derivative residual to create a reconstructed block. The loop filtering stage 486 can be applied to the reconstructed block to reduce distortion such as blocking artifacts.

Other variations of the encoder 470 can be used to encode the compressed bitstream 488. For example, a non-transform based encoder 470 can quantize the residual signal directly without the transform stage 474. In another implementation, an encoder 470 can have the quantization stage 476 and the dequantization stage 480 combined into a single stage.

Figure 5:
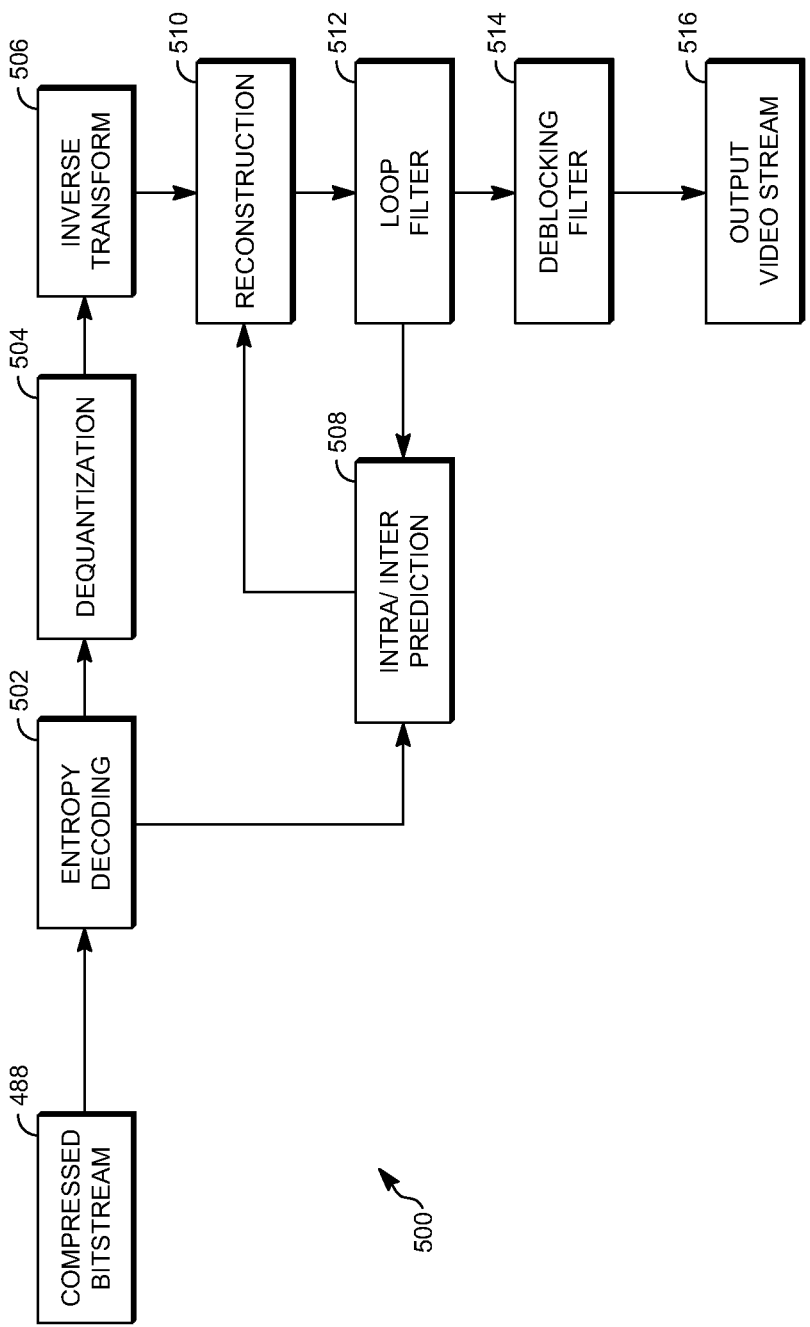
FIG. 5 is a block diagram of a video decompression system in accordance with an implementation.

FIG. 5 is a block diagram of a decoder 500 in accordance with an implementation. The decoder 500 can be implemented in the receiving station 130, for example, by providing a computer software program stored in memory such as memory 226. The computer software program can include machine instructions that, when executed by a processor such as CPU 224, cause receiving station 130 to decode video data in the manner described in FIG. 5. Decoder 500 can also be implemented directly in hardware included, for example, in transmitting station 112 or receiving station 130.

The decoder 500, similar to the reconstruction path of the encoder 470 discussed above, includes in one example the following stages to perform various functions to produce an output video stream 516 from the compressed bitstream 488: an entropy decoding stage 502, a dequantization stage 504, an inverse transform stage 506, an intra/inter prediction stage 508, a reconstruction stage 510, a loop filtering stage 512 and a deblocking filtering stage 514. Other structural variations of the decoder 500 can be used to decode the compressed bitstream 488.

When the compressed bitstream 488 is presented for decoding, the data elements within the compressed bitstream 488 can be decoded by the entropy decoding stage 502 (using, for example, Context Adaptive Binary Arithmetic Decoding) to produce a set of quantized transform coefficients. The dequantization stage 504 dequantizes the quantized transform coefficients, and the inverse transform stage 506 inverse transforms the dequantized transform coefficients to produce a derivative residual that can be identical to that created by the inverse transform stage 482 in the encoder 470. Using header information decoded from the compressed bitstream 488, the decoder 500 can use the intra/inter prediction stage 508 to create the same prediction block as were created in the encoder 470. At the reconstruction stage 510, the prediction block can be added to the derivative residual to create a reconstructed block. The loop filtering stage 512 can be applied to the reconstructed block to reduce blocking artifacts. The deblocking filtering stage 514 can be applied to the reconstructed block to reduce blocking distortion, and the result is output as the output video stream 516.

Other variations of the decoder 500 can be used to decode the compressed bitstream 488. For example, the decoder 500 can produce the output video stream 516 without the deblocking filtering stage 514.

Figure 6:
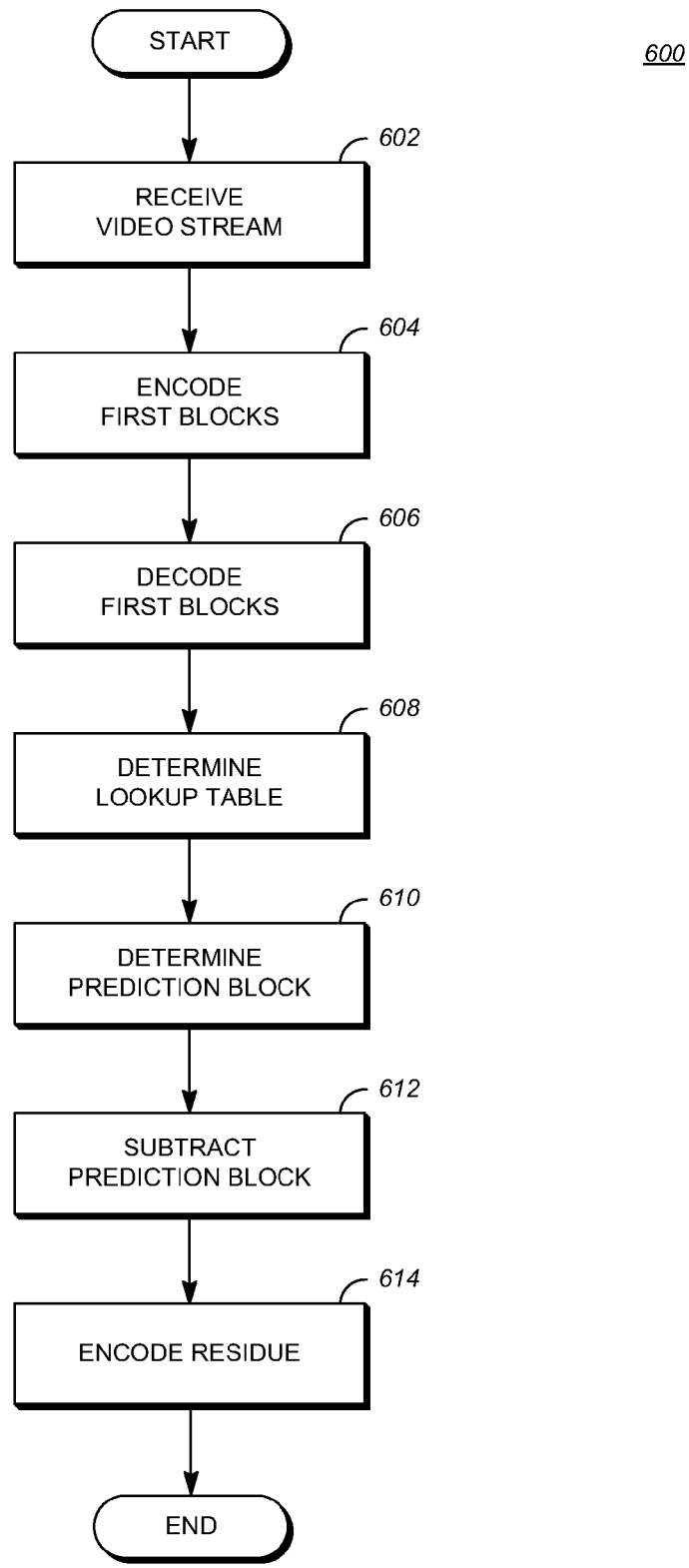
FIG. 6 is a flowchart diagram of an operation for encoding blocks using correlation-based inter-plane prediction in accordance with disclosed implementations.

FIG. 6 is a flowchart diagram of an operation 600 for encoding blocks using correlation-based inter-plane prediction in accordance with disclosed implementations. Implementations of operation 600 can be performed by storing instructions in a memory such as memory 226 of transmitting station 112 to be executed by a processor such as CPU 224, for example. Implementations of operation 600 can be performed in cooperation with an encoder, for example encoder 470. For example, implementations of operation 600 can be performed in whole or in part by intra/inter prediction stage 472 of encoder 470.

At step 602, a video stream is received by a computing device, such a transmitting station 112 that implements operation 600. Video data can be received in any number of ways, such as by receiving the video data over a network, over a cable, or by reading the video data from a primary memory or other storage device, including a disk drive or removable media such as a CompactFlash (CF) card, Secure Digital (SD) card, or the like.

Figure 8:
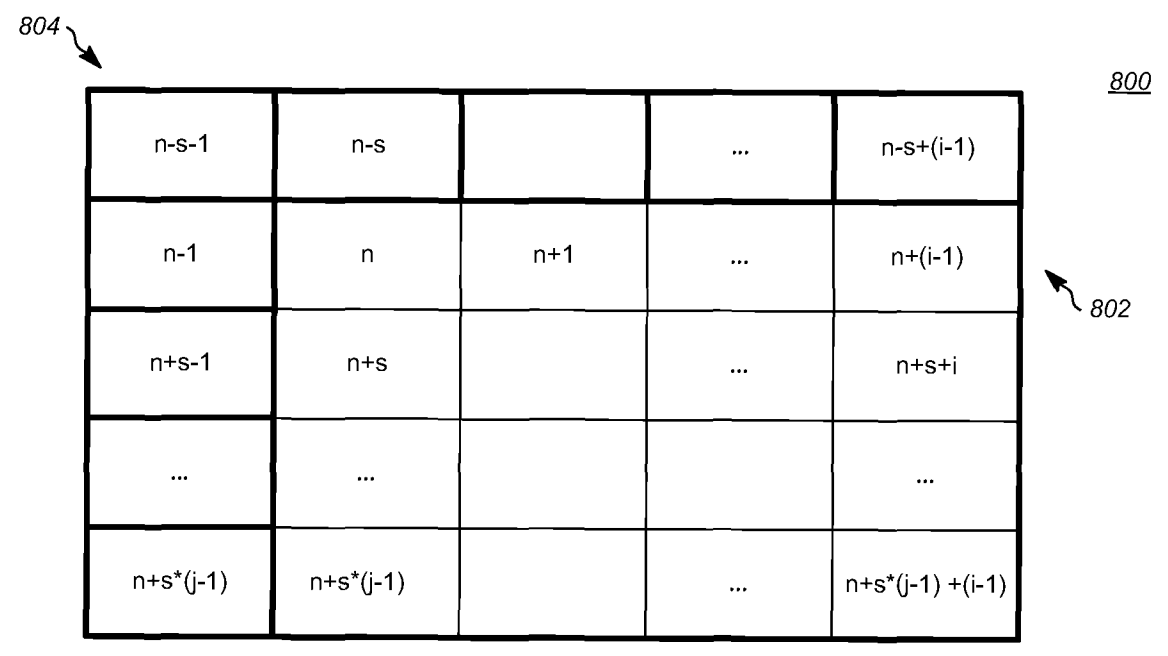

At step 604 blocks are encoded. The blocks to be encoded use pixels in a second plane peripheral to a block to be predicted in combination with blocks from a first plane peripheral to the block to be used to determine a lookup table to form the prediction. The relationship between these blocks and the pixels to be used from these blocks to form the lookup tables are shown in FIG. 8. In the case where the first and second planes have the same spatial sample rate, the corresponding blocks are selected to be spatially coextensive. In cases where the first and second planes have different spatial sample rates, the differing spatial sample rate will be taken into account to select spatially coextensive blocks corresponding to the same X, Y location in the planes.

At step 606 the first blocks are decoded, for example by processing with stages 480, 482 484 and 486 of encoder 470 and returned to the intra/inter prediction stage 472. At step 608, a lookup table is determined. The term "determine" as used herein means to select, construct, identify, specify or otherwise determine in any manner whatsoever. The lookup table can be determined by selecting first pixel values from pixels peripheral to a block in the first plane. The first pixel values can be used as indices into an empty array. Second pixel values are selected from the second plane from pixels peripheral to the block to be predicted. The second pixel values can be inserted into the lookup table at the indices formed by the spatially coextensive first pixel values. The so determined lookup table can be used to transform pixels from a block associated with the first plane to predict the pixels associated with the second plane The pixels used to form the lookup table at step 608 can be taken from spatially coextensive pixels peripheral to the block used to form the prediction and the block to be predicted. A row and column of pixels adjacent to the left and top edge of the blocks can be used to form the lookup table. In some cases, more than one row or column of pixels can be used to form more values in the lookup table. More detail regarding which peripheral pixels can be used to form a lookup table is given in relation to FIG. 8.

At step 610 the lookup table is used to determine a prediction block for the block from the second plane using the corresponding block from the first plane. Pixels are selected from the block in the first plane to be used to form the prediction block and used as indices into the lookup table. The values at the indices of the lookup table can then be inserted into a block at the spatially coextensive positions corresponding to the locations of the selected pixels to form the predicted block. More detail regarding determination of the prediction block is given in relation to FIG. 9.

Since the pixels of the block used to determine the prediction block can assume values other than the values of pixels used to populate the lookup table, it is possible that a pixel value can correspond to an index of the table associated with an empty location. For example, in some implementations, 8-bit pixels can have pixel values between 0 and 255. In the case of 8×8 blocks, when a lookup table is determined using one row of pixels peripheral to the left and top edges of a block, for example, a maximum of 15 pixel values would be used as indices into the table. If the current index points to an empty entry, the lookup table can be searched to find the first non-empty entry at an index greater than the current index and the first non-empty entry at an index less than the current index and an entry can be created by linear interpolation between the two values. In this way a prediction block for a block in a second plane can be determined from a block in a first plane.

At step 612 the determined prediction block is subtracted from the block to be predicted. Prediction blocks determined in this fashion can be good predictors of a block since data in planes corresponding to components of data such as YUV representations can be highly correlated as long as differences in gain and offset are compensated for. Subtracting the prediction block from a block to be predicted results in a residual block. Good prediction results in a residual block including small pixel values having low spatial frequency and can be represented by a small number of bits following further encoding. At step 614 the residual block can be further encoded by transforming the residue as described above in relation to stage 474, quantizing the transformed residual block for example by stage 476 and entropy encoding (stage 478).

For simplicity of explanation, implementations of operation 600 are depicted and described as a series of steps. However, steps in accordance with this disclosure can occur in various orders and/or concurrently. For example, while in FIG. 6, the first blocks appear to be encoded at 604 before the first blocks are decoded at 606, it shall be appreciated that blocks may be encoded and decoded in other orders and remain within the scope of this disclosure. For example, one first block can be encoded and decoded before or concurrently with the encoding and decoding of the remainder of the first blocks. Additionally, steps in accordance with this disclosure may occur with other steps not presented and described herein. Furthermore, not all illustrated steps (e.g., 602) may be required to implement a method in accordance with the disclosed subject matter.

For example, a transformation other that a lookup table can be utilized to determine a prediction block for the block from the second plane using the corresponding block from the first plane at step 610 and/or step 608 can be omitted. The transformation could, instead or in addition to a lookup table, include using linear regression, for example, to calculate a linear relationship between the pixels of the two planes and applying the linear relationship to the pixels of the first block to predict the pixels of the second block. Other ways to implement this transformation can include approximating the transform on a per-pixel basis based on minimizing the residual values following prediction, for example.

Figure 7:
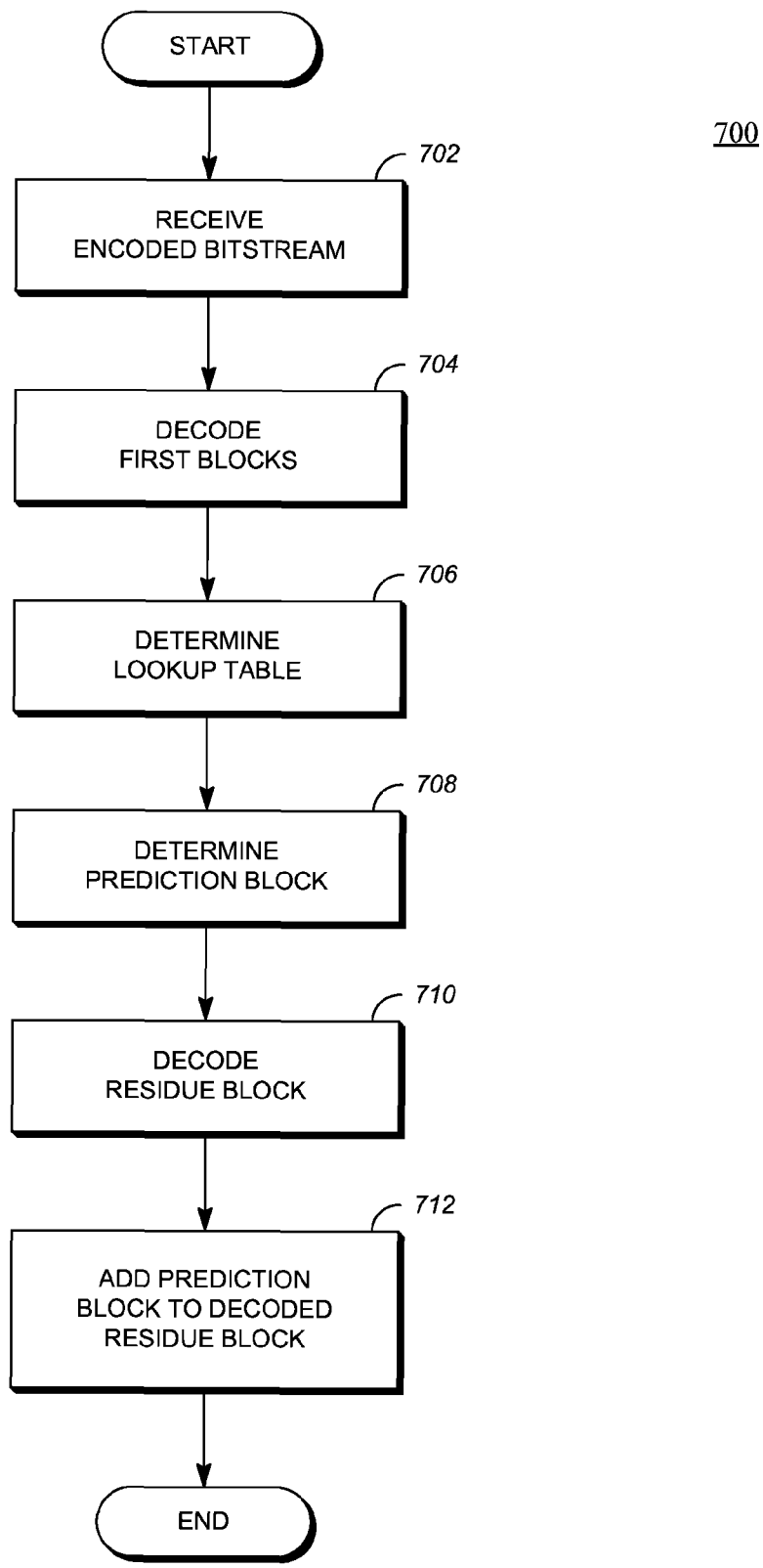
FIG. 7 is a flowchart diagram of an operation for decoding blocks using inter-plane prediction in accordance with disclosed implementations.

FIG. 7 is a flowchart diagram of an operation 700 for decoding blocks using inter-plane prediction in accordance with disclosed implementations. Method of operation 700 can be performed by storing instructions in a memory of transmitting station 12 to be executed by a CPU, for example. Implementations of operation 700 can be performed in cooperation with a decoder, for example decoder 500.

At step 702, a bitstream encoded according to disclosed implementations as described in relation to FIG. 6 is received by a computing device, such a receiving station 130 that implements operation 700. Video data can be received in any number of ways, such as by receiving the video data over a network, over a cable, or by reading the video data from a primary memory or other storage device, including a disk drive or removable media such as a CompactFlash (CF) card, Secure Digital (SD) card, or the like.

At step 704 blocks are decoded by the decoder implementing operation 700. These blocks include a block from a first plane to be used to determine the prediction block and pixels from the first and second planes peripheral to the block to be predicted and the block to be used to form the predicted block to determine a lookup table. At step 706, a lookup table is determined as described in relation to FIG. 6, above, using pixels from blocks adjacent to the block in the first plane to be used to form the predicted block and pixels from blocks adjacent to the block in the second plane to be predicted.

At step 708, intra/inter prediction stage 508 determines the prediction block using a decoded block from a first plane and the determined lookup table from step 706. At step 710 the block to be predicted, the residual block, is decoded by the decoder using stage 502, entropy decoding, stage 504 dequantization, stage 506 inverse transform and passed to stage 510, reconstruction, for example. At step 712, the prediction block is passed from intra/inter prediction stage 508 to reconstruction stage 510 to be added to the decoded residual block to form a reconstructed block.

For simplicity of explanation, implementations of operation 700 are depicted and described as a series of steps. However, steps in accordance with this disclosure can occur in various orders and/or concurrently. For example, with respect to FIG. 7, the first blocks all appear to be decoded at 704 before the lookup table is determined at 706, it shall be appreciated that some blocks may be decoded in other orders and remain within the scope of this disclosure. For example, some of the first blocks can be decoded before or concurrently with determination of the lookup table. Additionally, steps in accordance with this disclosure may occur with other steps not presented and described herein. Furthermore, not all illustrated steps (e.g., 702) may be required to implement a method in accordance with the disclosed subject matter.

For example, a transformation other than a lookup table can be utilized to determine the prediction block using a decoded block from a first plane at step 708 and/or step 706 can be omitted. The transformation could, instead or in addition to a lookup table, include using linear regression, for example, to calculate a linear relationship between the pixels of the two planes and applying the linear relationship to the pixels of the first block to predict the pixels of the second block. Other ways to implement this transformation can include approximating the transform on a per-pixel basis based on minimizing the residual values following prediction, for example.

FIG. 8 is a diagram of a portion of a plane 800 showing a block 802 and peripheral pixels 804 used to form a lookup table in accordance with disclosed implementations. The block 802 is an i×j block represented by a single dimensional array which starts at pixel n and extends along rows of i pixels to pixel n+(i−1), and down j columns to pixel n+s*(j−1). The value "s" is the stride, which is used when calculating the index of the block 802 that is part of a single dimensional array that forms the plane 800. The stride s compensates for the additional pixels in the row following the block row and preceding the next block row in the single dimensional array. Thus the second row of the block 802 starts at pixel n+s. These indices are used to access pixels of a block 802 of a plane 800 to be predicted and the corresponding block of another plane to be used to form the prediction block.

Pixels in row n−s through n−s+(i−1) and column n−1 through n+s*(j−1) plus the top left corner pixel n−s−1 are examples of pixels 804 peripheral to blocks in a plane to be used to form the lookup table to be used to form the prediction block. As described above, values of pixels of another plane corresponding to pixels 804 peripheral to a block 802 of a plane 800 are used as indices into an array where the values in the array can include the values of pixels 804 at the corresponding position peripheral to a block 802 in a plane 800 to be predicted. Pixels 804 can be selected from pixels peripheral to the top and left edge of a block 802, for example, in implementations where blocks are processed (e.g., encoded and/or decoded) in raster scan order starting at the top left corner of the plane. Pixels 804 will have already been encoded and decoded prior to them being used to form a prediction block.

To create a lookup table for two planes (e.g. trying to predict the U plane from the Y plane), a computing device can first iterate over each pixel/component in all the edge pixels of blocks that have previously been decoded, i.e. for which both the U and the Y pixel values are already known. These pixel values can be used to populate a count/value lookup table, to keep track of the pixel values that the U component had in each edge pixel for a given Y component value. We assume 8-bit values, i.e. a range of [0, 255]. The following pseudo-code illustrates this process:

```
    int val[256], cnt[256], x;
    // set each value to zero
    for (x=0; x<256; x++)
        val[x]=cnt[x]=0;
    // iterate over top pixels
    for (x=0; x<16/* number of pixels at the top */; x++) {
        int top_pixel_y_value=y_data[x-y_stride];
        int top_pixel_u_value=u_data[x-u_stride];
        val[top_pixel_y_value]+=top_pixel_u_value;
        cnt[top_pixel_y_value]+=1;
    }
``` wherein:
val[256] is the lookup table array,
cnt[256] is an array which keeps track of how many times a particular index was accessed,
y_data[ ] is a single dimensional array containing the Y plane data,
u_data[ ] is a single dimensional array containing the U plane data, and
y_stride and u_stride are values used to access pixels in a single dimensional array exactly one
row apart. For example, a pixel from location y_data[x−y_stride] would occur one row above a pixel from location y_data[x].

The above pseudo-code accesses pixels peripheral to the top edge of a block of the Y plane and uses pixel values of the peripheral Y pixels as indices into the arrays val[ ] and cnt[ ] to add pixel values of spatially coextensive pixels from the U plane into the val[ ] array and increment the count in the cnt[ ] array. Additional pseudo-code (not shown) can similarly process pixels peripheral to the left edge and the top/left pixel of the block. Some implementations can use more than one row or column of pixels peripheral to the block (e.g., pixels not immediately adjacent to the block). For example, a top/left edge border of 2, 3, and/or 4 pixels thick can be used.

After the val[ ] and cnt[ ] arrays are populated, the value accumulator can be divided by the number of times each value occurred, such as shown by the following pseudo-code:

```
    for (x=0; x<256; x++)
        if (cnt[x]>0)
            val[x]/=cnt[x];
```

This final step provides a lookup table (val[ ]) based on an average relationship between U pixel values and Y pixel values based on pixels peripheral to the top, left and top/left pixels to the block.

The following pseudo-code illustrates using a block from the Y plane to predict a block from the U plane. This routine iterates over the current block's Y pixels, which have been previously encoded and decoded, and uses these to serve as a predictor for the U value, using the above generated lookup table as the prediction method. In this example, the Y and U planes have the same spatial sampling rate.

```
    for (y=0; y<16/* vertical MB size */; y++) {
        for (x=0; x<16/* horizontal MB size */; x++) {
            int y_pixel_value=y_data[y*y_stride+x];
            int     predicted_u_value=find_nearest_table_value
                (val, cnt, y_pixel_value);
            u_data[y*y_stride+x]=predicted_u_value;
```

}
}
find_nearest_table_value( ) is a function that will look at the nearest value in the lookup-table for which at least one Y pixel of the peripheral pixels had the same value, (e.g., cnt[index] is non-zero), and returns the predicted U pixel value for that position.

```
int find_nearest_table_value(int table[ ], int cnt[ ], int
    index) {
  int radius=0;
  do {
    if (index+radius <255 && cnt[index+radius])
      return val[index+radius]
    else if (radius && index−radius >=0 && cnt[index−
        radius])
      return val[index−radius];
    radius++;
  } while (1);
  // should never be reached
}
```

Aspects of the disclosed implementations can find the nearest two values with a non-zero counter and form a weighted interpolation between the two values. More complex techniques for extracting results from a sparsely populated table, such as curve fitting can be used to calculate the value from the lookup table. An aspect of disclosed implementations can fill in the entire table by interpolating and possibly filtering values for all positions in the table. The table can be populated by using more than one adjacent row and column from the planes to obtain more values.

The inter-plane prediction technique uses correlation between two different planes in previously decoded value to predict the values of one such plane from the values of another plane in the current block as a means of more accurately predicting the signal, and thus decreasing the amount of residual coefficients that have to be coded in the bitstream, thus saving bandwidth and/or increasing video quality. Prediction isn't limited from or to a single or specific plane. The Y plane can be used to predict both U and V, or U to predict Y and V, or U and V together to predict Y, for example.

Figure 9:
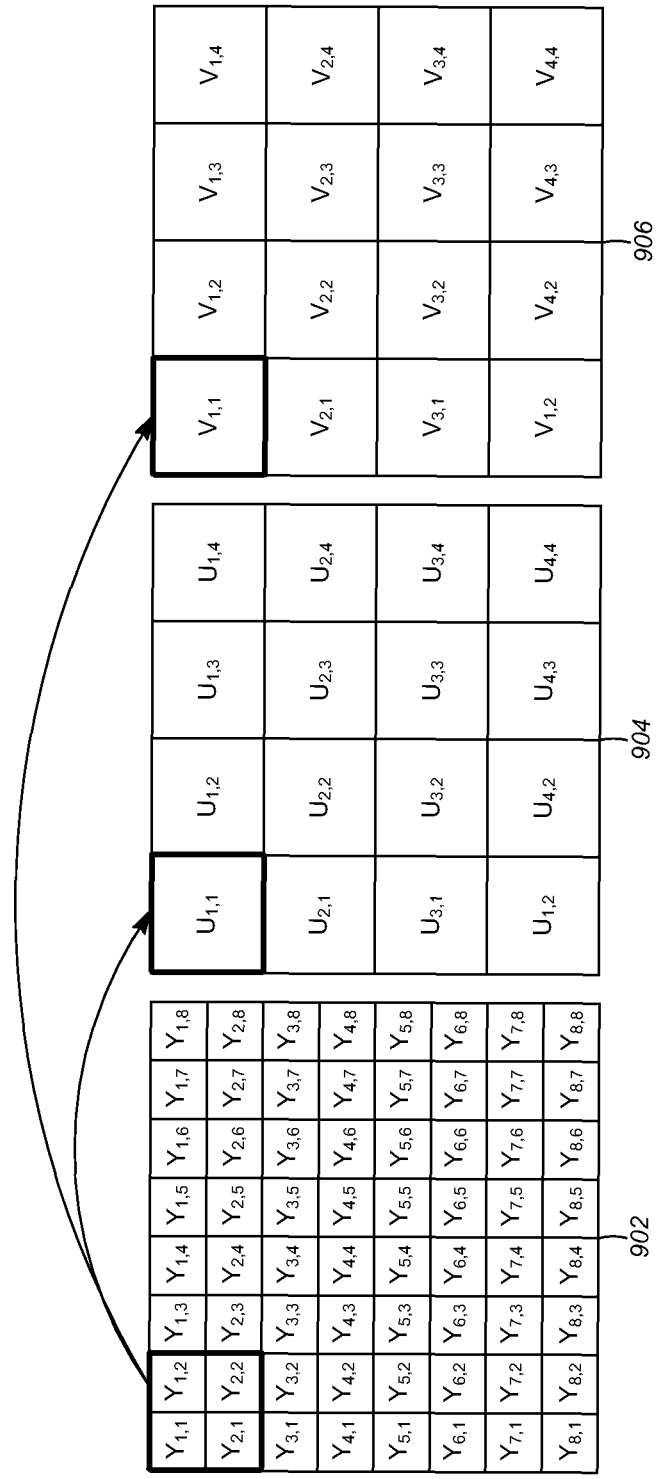
FIG. 9 is a diagram of spatially coextensive pixels in planes having different spatial sample rates in accordance with disclosed implementations.

FIG. 9 is a diagram of spatially coextensive pixels in planes having different spatial sample rates in accordance with disclosed implementations. This example illustrates an 8 X 8 Y plane block 902, a corresponding 4 X 4 U plane block 904 and corresponding 4 X 4 V plane block 906. The U and V plane blocks 904, 906 are sampled at a spatial sample rate of ½ the spatial sample rate of the Y plane in both the X and Y directions. As illustrated in FIG. 9, the four pixels from the Y plane block 902 labeled $Y_{1,1}$, $Y_{1,2}$, $Y_{2,1}$, and $Y_{2,2}$ correspond to single pixels $U_{1,1}$ and $V_{1,1}$ in U and V plane blocks 904, 906. When predicting U or V plane blocks 904, 906 using a Y plane block 902, for example, four pixels from the Y plane block 902 can be averaged to create a single value to be used to predict the U or V plane blocks 904, 906. In examples where the U or V plane blocks 904, 906 can be used to predict the Y plane block 902, single pixels from the U or V plane blocks 904, 906 can be replicated to form four pixels to predict the Y plane block 902. Aspects of disclosed implementations can filter the replicated pixels from the U or V plane blocks 904, 906 to smooth the data prior to forming a prediction block.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such.

The implementations of encoding and decoding described above illustrate some exemplary encoding and decoding techniques. However, it is to be understood that encoding and decoding, as those terms are used in the claims, could mean compression, decompression, transformation, or any other processing or change of data.

The implementations of the transmitting station 112 and/or the receiving station 130 (and the algorithms, methods, instructions, etc. stored thereon and/or executed thereby) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination. The terms "signal" and "data" are used interchangeably. Further, portions of the transmitting station 112 and the receiving station 130 do not necessarily have to be implemented in the same manner.

Further, in one implementation, for example, the transmitting station 112 or the receiving station 130 can be implemented using a general purpose computer or general purpose processor with a computer program that, when executed, carries out any of the respective methods, algorithms and/or instructions described herein. In addition or alternatively, for example, a special purpose computer/processor can be utilized which can contain other hardware for carrying out any of the methods, algorithms, or instructions described herein.

The transmitting station 112 and receiving station 130 can, for example, be implemented on computers in a video transmission system. Alternatively, the transmitting station 112 can be implemented on a server and the receiving station 130 can be implemented on a device separate from the server, such as a hand-held communications device. In this instance, the transmitting station 112 can encode content using an encoder 470 into an encoded video signal and transmit the encoded video signal to the communications device. In turn, the communications device can then decode the encoded video signal using a decoder 500. Alternatively, the communications device can decode content stored locally on the communications device, for example, content that was not transmitted by the transmitting station 112. Other suitable transmitting station 112 and receiving station 130 implementation schemes are available. For example, the receiving station 130 can be a generally stationary personal computer rather than a portable communications device and/or a device including an encoder 470 may also include a decoder 500.

Further, all or a portion of implementations of the present invention can take the form of a computer program product accessible from, for example, a tangible computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described implementations have been described in order to allow easy understanding of the present invention and do not limit the present invention. On the contrary, the invention is intended to cover various modifications and equivalent arrangements included within the scope of the appended claims, which scope is to be accorded the broadest interpretation so as to encompass all such modifications and equivalent structure as is permitted under the law.

I claim:

1. A method for decoding an encoded video stream having a plurality of frames that include a plurality of blocks, the method comprising:
    decoding a first block of the plurality of blocks, wherein the first block is indicative of data associated with a first plane of the encoded video stream, and wherein the first block is at least partially spatially coextensive with a second block of the plurality of blocks that is indicative of data associated with a second plane of the encoded video stream;
    generating a lookup table, as an array, by:
        selecting first peripheral pixel values from first pixels within at least one block peripheral to the first block, wherein the first peripheral pixel values are indicative of data associated with the first plane;
        using at least some of the first peripheral pixel values as indices to the array;
        selecting second peripheral pixel values from second pixels within at least one block peripheral to the second block, the second pixels being at least partially spatially coextensive with the first pixels, wherein the second peripheral pixel values are indicative of data associated with the second plane;
        adding, into respective entries of the array, at an index formed by a first peripheral pixel value of a respective first pixel indicative of data associated with the first plane, a second peripheral pixel value of a respective second pixel that is indicative of data associated with the second plane and that spatially corresponds to the respective first pixel; and
        determining a respective average value for at least some of the entries of the array by dividing an entry by a respective number of second peripheral pixel values added to the entry;
    generating a predicted second block by setting pixel values of the predicted second block to values from the lookup table, wherein for a pixel at a location in the predicted second block, a pixel value from a spatially corresponding pixel at the location in the decoded first block is used as an index into the lookup table to select an entry from the lookup table for the location in the predicted second block; and
    decoding the second block using the predicted second block.

2. The method of claim 1, wherein decoding the second block using the predicted second block further comprises:
    inverse transforming residuals of the second block; and
    adding the inverse transformed residuals to the predicted second block.

3. The method of claim 1, further comprising:
    determining, using a computing device, a transformation based on at least some of the first peripheral pixel values and third peripheral pixel values of third pixels within at least one block peripheral to a third block of the plurality of blocks, wherein the first block is at least partially spatially coextensive with the third block, the first pixels are at least partially spatially coextensive with the third pixels, and the third block is indicative of data associated with a third plane of the encoded video stream;
    generating a predicted third block using the decoded first block and the transformation; and
    decoding the third block using the predicted third block.

4. The method of claim 1, wherein the first pixels within at least one block peripheral to the first block and the second pixels within at least one block peripheral to the second block include one or more rows of pixels within at least one block peripheral to a top side of the first and second blocks, respectively, one or more columns of pixels within at least one block peripheral to a left side of the first and second blocks, respectively, and a pixel within a block peripheral to a top-left corner of the first and second blocks, respectively.

5. The method of claim 1, wherein the first block and the second block have different sample rates.

6. The method of claim 1, further comprising:
    if the value selected from the lookup table for the location is unavailable, determining a value based on the selected value by selecting a value in the lookup table at another index that is greater or that is less than the index.

7. The method of claim 1, further comprising:
    determining, in place of an unavailable value in the lookup table at an index based on a first pixel, a value by interpolating between a value in the lookup table at an index that is greater than the index and a value in the lookup table at an index that is less than the index.

8. The method of claim 1, further comprising:
    decoding a third block of the plurality of blocks wherein the third block is indicative of data associated with a third plane of the encoded video stream, and wherein the third block is at least partially coextensive with the first block,
    wherein generating the lookup table is further based on third peripheral pixel values of third pixels within at least one block peripheral to the third block, the third pixels being at least partially spatially coextensive with the first pixels, and
    wherein generating the predicted second block further includes using the third block.

9. A method for encoding a video stream having a plurality of frames that include a plurality of blocks comprising:
    generating a lookup table as an array, using pixel values of a first block of the plurality of blocks, the first block being associated with a first plane of the video stream, by:
        selecting first peripheral pixel values from first pixels within at least one block peripheral to the first block, the first peripheral pixel values being associated with the first plane of the video stream;

using at least some of the first peripheral pixel values as indices to the array;
selecting second peripheral pixel values from second pixels within at least one block peripheral to a second block associated with a second plane of the video stream, the second pixels being at least partially spatially coextensive with the first pixels;
adding, into respective entries in the array, at an index formed by a first peripheral pixel value of a respective first pixel associated with the first plane of the video stream, a second peripheral pixel value of a respective second pixel that is associated with the second plane and that spatially corresponds to the respective first pixel; and
determining a respective average value for at least some of the entries of the array by combining respective second peripheral pixel values added to the entry;
generating a predicted second block for the second block using pixel values of the first block and the lookup table; and
encoding the second block using the predicted second block.

10. The method of claim 9, wherein generating a predicted second block using the pixel values of the first block and the lookup table further comprises:
selecting a pixel value from entries of the lookup table by using a pixel value of a first pixel from the first block as an index to the lookup table; and
storing a final pixel value for the predicted second block based on the selected pixel value at a position in the predicted second block corresponding to a position of the first pixel.

11. The method of claim 10, further comprising:
if the pixel value selected from the lookup table is unavailable, determining the final pixel value for the predicted second block by selecting a value in the lookup table at an index that is greater or that is less than an index based on the first pixel.

12. The method of claim 10, further comprising:
determining, in place of an unavailable pixel value in the lookup table at the index, a value by interpolating between a value in the lookup table at an index that is greater than the index and a value in the lookup table at an index that is less than the index.

13. The method of claim 9, further comprising:
determining, using a computing device, a transformation based on at least some of the first peripheral pixel values and third peripheral pixel values from third pixels within at least one block peripheral to a third block of the plurality of blocks, wherein the first block is at least partially spatially coextensive with the third block, the third pixels are at least partially spatially coextensive with the first pixels, and the third block is indicative of data associated with a third plane of the video stream;
generating a predicted third block using the first block and the transformation; and
encoding the third block using the predicted third block.

14. The method of claim 9, wherein generating the lookup table is further based on third peripheral pixel values of third pixels within at least one block peripheral to a third block, wherein the third pixels are at least partially spatially coextensive with the first pixels, the third block is indicative of data associated with a third plane of the video stream, and the third block is at least partially coextensive with the first block, and wherein generating the predicted second block further includes using the third block.

15. A method for encoding a video stream having a plurality of frames that include a plurality of blocks comprising:
determining, using a computing device, a first transformation based on first pixel values of first pixels of a first plane and second pixel values of second pixels of a second plane of the video stream, the first pixels located in at least one block peripheral to a first block of the plurality of blocks and the second pixels located in at least one block peripheral to a second block of the plurality of blocks, wherein the first block is indicative of data associated with the first plane, the second block is indicative of data associated with the second plane, the first block is at least partially spatially coextensive with the second block, the first pixels are spatially coextensive with the second pixels, and the first transformation transforms first pixel values of the spatially coextensive pixels that are peripheral to the first block into values that approximate second pixel values of the spatially coextensive pixels that are peripheral to the second block by:
determining a lookup table by:
using the first pixel values of the first pixels of the first plane as indices in an array;
using the second pixel values of the second pixels of the second plane for entries in the lookup table at the indices formed by the first pixel values by associating a value of a respective second pixel in the lookup table with an index selected by using a first pixel value of a respective first pixel that spatially corresponds to the respective second pixel and combining values of the respective second pixels associated with the index to generate a single value for a respective entry;
determining, using a computing device, a second transformation based on the second pixel values and third pixel values of third pixels of a third plane, the third pixels located in at least one block peripheral to a third block of the plurality of blocks, wherein the second block is indicative of data associated with the second plane, the second pixels are spatially coextensive with the third pixels, and the third block is at least partially spatially coextensive with the second block;
generating a predicted second block using the first block and the lookup table of the first transformation, and using the third block and the second transformation; and
encoding the second block using the predicted second block.

16. An apparatus for decoding a frame in a video stream having a plurality of frames that include a plurality of blocks, the apparatus comprising:
a memory; and
a processor configured to execute instructions stored in the memory to:
decode a first block of the plurality of blocks, wherein the first block is indicative of data associated with a first plane of the video stream, and wherein the first block is at least partially spatially coextensive with a second block of the plurality of blocks that is indicative of data associated with a second plane of the video stream;
generate a lookup table, as an array, by instructions to:
select first peripheral pixel values from first pixels within at least one block peripheral to the first block, wherein the first peripheral pixel values are indicative of data associated with the first plane;
use at least some of the first peripheral pixel values as indices to the array;
select second peripheral pixel values from second pixels within at least one block peripheral to the second block, the second peripheral pixel values being at least partially spatially coextensive with the first peripheral pixel values, wherein the second peripheral pixel values are indicative of data associated with the second plane;
add, into respective entries in the array, at an index formed by a first peripheral pixel value of a respective first pixel indicative of data associated with the first plane, a second peripheral pixel value from a respective second pixel that is indicative of data associated with the second plane and spatially corresponds to the respective first pixel; and
determine a respective single value for at least some of the entries of the array by combining respective second peripheral pixel values added to the entry;
generate a predicted second block by instructions to set pixel values of the predicted second block to values from the lookup table, wherein for a pixel at a location in the predicted second block, a pixel value from a spatially corresponding pixel at the location in the first block is used as an index into the lookup table to select an entry from the lookup table for the second predicted block; and
decode the second block using the predicted second block.

17. An apparatus for encoding a frame in a video stream having a plurality of frames that include a plurality of blocks, the apparatus comprising:
a memory; and
a processor configured to execute instructions stored in the memory to:
generate a lookup table as an array, using pixel values of a first block of the plurality of blocks, the first block being associated with a first plane of the video stream, by instructions to:
select first peripheral pixel values from first pixels within at least one block peripheral to the first block, the first peripheral pixel values being associated with the first plane;
use at least some of the first peripheral pixel values as indices to the array;
select second peripheral pixel values from second pixels within at least one block peripheral to a second block associated with a second plane of the video stream, the second pixels being at least partially spatially coextensive with the first pixels;
add, into respective entries in the array, at an index formed by a first peripheral pixel value of a respective first pixel associated with the first plane, a second peripheral pixel value of a respective second pixel that is associated with the second plane and spatially corresponds to the respective first pixel; and
determine a respective single value for at least some of the entries of the array by dividing an entry by a respective number of second peripheral pixel values added to the entry;
generate a predicted second block by instructions to set pixel values of the predicted second block to values from the lookup table, wherein for a pixel at a location in the predicted second block, a pixel value from a spatially corresponding pixel at the location the first block is used as an index into the lookup table to select an entry from the lookup table for the location in the predicted second block; and
encoding the second block using the predicted second block.

18. The method of claim 9, further comprising:
encoding the first block.

19. The method of claim 3, wherein:
the lookup table is a first lookup table;
determining the transformation comprises generating a second lookup table, as a second array, by:
using at least some of the first peripheral pixel values as indices to the second array; and
inserting, into respective entries in the second array, at an index formed by a first peripheral pixel value of a respective first pixel, a third peripheral pixel value of a respective third pixel that spatially corresponds to the respective first pixel; and
generating the predicted third block comprises by setting pixel values of the predicted third block to values from the lookup table, wherein for a pixel at a location in the predicted third block, a pixel value from a spatially corresponding pixel at the location in the decoded first block is used as an index into the lookup table to select an entry from the lookup table for the location in the predicted third block.

* * * * *